(«12») United States Patent
van Rijckevorsel et al.

(10) Patent No.: US 11,433,968 B2
(45) Date of Patent: Sep. 6, 2022

(54) BICYCLE

(71) Applicant: Koninklijke Gazelle N.V., Dieren (NL)

(72) Inventors: Guido van Rijckevorsel, Dieren (NL); Bastiaan Johan Engelblik, Dieren (NL)

(73) Assignee: KONINKLIJKE GAZELLE N.V.

( * ) Notice: Subject to any disclaimer, the term of this patent is extended or adjusted under 35 U.S.C. 154(b) by 102 days.

(21) Appl. No.: 17/006,325

(22) Filed: Aug. 28, 2020

(65) Prior Publication Data

US 2021/0061401 A1    Mar. 4, 2021

(30) Foreign Application Priority Data

Sep. 2, 2019 (NL) .................................... 2023744

(51) Int. Cl.
| | |
|---|---|
| *B62K 21/12* | (2006.01) |
| *B62K 19/32* | (2006.01) |
| *B62K 21/18* | (2006.01) |
| *B62J 11/10* | (2020.01) |
| *B62K 19/40* | (2006.01) |
| *B62K 3/02* | (2006.01) |

(52) U.S. Cl.
CPC .............. *B62K 21/12* (2013.01); *B62J 11/10* (2020.02); *B62K 3/02* (2013.01); *B62K 19/32* (2013.01); *B62K 19/40* (2013.01); *B62K 21/18* (2013.01)

(58) Field of Classification Search
CPC ... B62J 11/10; B62J 11/13; B62J 11/16; B62J 11/19
USPC ......................................................... 280/279
See application file for complete search history.

(56) References Cited

U.S. PATENT DOCUMENTS

| | | | | |
|---|---|---|---|---|
| 6,983,949 | B2* | 1/2006 | Ueno ....................... | B62J 11/19 280/279 |
| 7,192,044 | B2* | 3/2007 | Ueno ...................... | B62K 21/06 280/280 |
| 7,566,065 | B2* | 7/2009 | Fukui ..................... | B62K 19/38 280/281.1 |
| 9,409,618 | B2* | 8/2016 | Lanz ...................... | B62K 21/06 |
| 9,446,812 | B2* | 9/2016 | Nago ..................... | B62K 21/12 |

* cited by examiner

*Primary Examiner* — Kevin Hurley
*Assistant Examiner* — Hosam Shabara
(74) *Attorney, Agent, or Firm* — Mendelsohn Dunleavy, P.C.

(57) ABSTRACT

Bicycle comprising a head tube (3), a down tube and a steering tube. The head tube comprises a cable passage (14) connecting the interior of the head tube with the interior of the down tube. The steering tube (16) engages an upper bearing (18) and a lower bearing (19) within the head tube. The upper bearing is below the cable passage. Cables (12) enter the head tube (3) at a top end of the head tube and leave the head tube via the cable passage (14) to the down tube (4).

20 Claims, 4 Drawing Sheets

BICYCLE

The present disclosure relates to a bicycle, in particular to a bicycle having cables routed via the downtube.

Bicycles typically include several cables, such as Bowden cables, hydraulic cables and electrical cables. These cables can for example be gear change cables, brake cables and electrical cables for lights. Such cables affect the appearance of the bicycle and can easily be damaged.

To protect and hide the cable from view the cables are often partly routed via the inside of one or more frame tubes. This results in a more aerodynamic and more aesthetic appearance and improved protection of the cables.

Generally, the cables are routed via the down tube. To enter the down tube, the head tube must first be bypassed. The head tube comprises an upper and a lower bearing for the steering tube. Since the upper bearing bars passage of cables, the cables must enter the downtube via an opening in the tube wall of the downtube.

U.S. Pat. No. 9,409,618 discloses a cable routing making use of a guide device within the head tube guiding cables past the upper bearing into the tube interior between the upper and lower bearing where the cables enter the down tube. The upper bearing is placed in a seat at the upper end of the head tube. The use of an additional guiding device complicates the construction. Moreover, the cables are clamped and curved in the guiding device with little freedom of movement during rotation of the steering tube.

It is an object of the invention to provide a cable routing via the head tube with less friction and bending loads on the cables.

The object of the invention is achieved with a bicycle comprising:
 a head tube;
 a down tube connected to the head tube, the head tube comprising a cable passage connecting the interior of the head tube to the interior of the down tube; and
 a steering tube rotatably mounted in an upper bearing and a lower bearing within the head tube,
 wherein the upper bearing is below the cable passage.

The normal position of the upper bearing is at the upper end of the head tube. Lowering its position to a point below the cable passage, creates space for gear change and/or brake cables, or any further type of cables, so they have sufficient freedom of movement, in particular during steering.

This measure also makes it possible to route the cables via the top end of the head tube, so the cables can enter the frame at a high level and leave the head tube via the cable passage to the down tube. A larger part of the cables is hidden from view and is protected by the frame tubes.

The steering tube may engage the upper and/or lower bearings directly, or via one or more other parts, for instance via the lower part of the stem.

The down tube can have an outer end connecting to the outer wall of the head tube and surrounding the cable passage. Alternatively, the down tube can connect to a tubular branch of the head tube, or it can connect indirectly to the head tube via one or more intermediate parts, as long as the cable passage connects the interior of the down tube and the interior of the head tube.

The bicycle may further comprise handlebars and a stem with a top end supporting the handlebars and a lower end connected to a top end of the steering tube, for example, by clamping, so the steering tube rotates with the handle bars during steering. The assembly of the steering tube and the stem projects through the open end of the head tube leaving space for passage of the one or more cables, e.g., via the top end of the head tube.

The lower part of the stem and adjacent sections of said one or more cables can for example be covered by a stem cover having a top end joining the stem. The top end of the stem cover can be provided with a cable entry opening, for example by a recessed top edge of the stem cover. To obtain a visually integrated appearance, the stem cover can be made flush with the head tube and with the adjacent upper part of the stem.

The stem cover can for example comprise two or more semi-tubular sections fitting around the lower stem section. The stem cover sections are connected to the stem, e.g., by means of sunk screw connections, and rotate with the stem during steering. In this respect, the expression "semi-tubular sections" refers to any pair of shells that can be assembled about a steering tube or stem to form a tubular stem cover.

The stem cover creates an annular space around the section of the stem connecting to the steering tube. Cables can be routed via the cable entry opening of the stem cover, the annular space and the cable passage into the down tube. Thus, the stem cover can be designed to confine a channel accurately guiding the cables from the cable entry opening to the cable passage to the down tube during assembly when the cables are put in place.

The stem cover can also be used for attaching further facilities, such as an attachment part for a bicycle lamp.

In order to protect the cables, the head tube may further be provided with a rotation limiting device for limiting rotation of the steering tube relative to the head tube. Such a rotation limiting device can for example be formed by and inwardly projecting element of the head tube and, at the same level, a ring attached to the steering tube, the ring comprising a radially extending projection abutting the inwardly projecting element at a given maximum rotation of the steering tube. The inwardly projecting element can for example be a screw, pin or bolt. In case of damage the ring is easily replaceable if it is positioned near the top end of the head tube, e.g., on a cylindrical spacer fitting on the steering tube between the ring and the upper bearing. The spacer and the rotation limiting device are spaced from the interior wall of the head tube to confine an annular space allowing passage of the cables.

Within the context of this invention, bicycles include any wheeled vehicle with a frame comprising a head tube and a down tube. This includes, e.g., tricycles and cycles with an auxiliary drive, such as a fuel engine or electric drive.

BRIEF DESCRIPTION OF THE DRAWINGS

The above-described aspects will hereafter be further explained with reference to the drawings showing an exemplary embodiment.

DETAILED DESCRIPTION OF EMBODIMENTS

Figure 1:
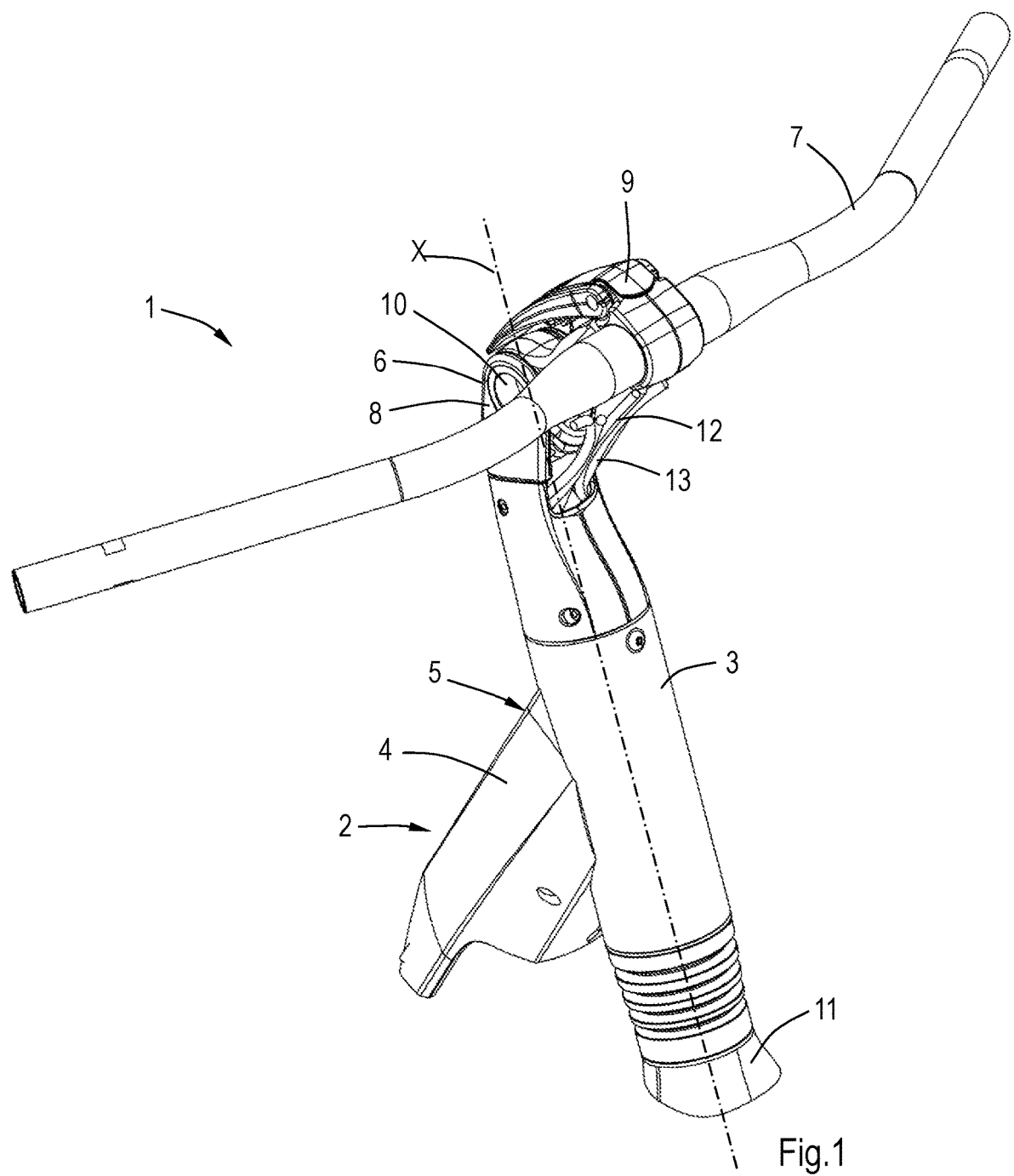
FIG. 1: shows a steering section of a bicycle according to the present invention.
Figure 2:
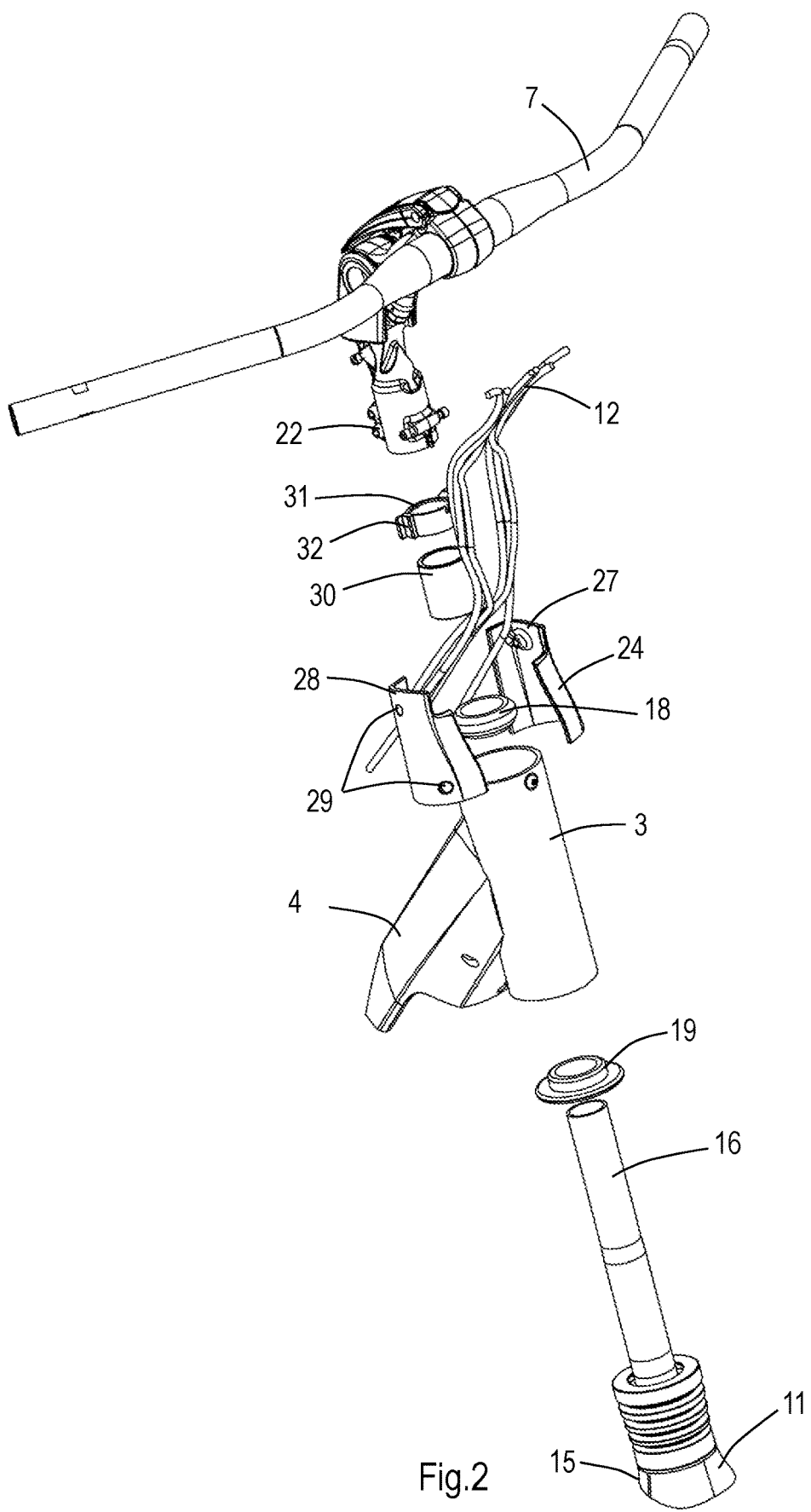
FIG. 2: shows the section of FIG. 1 in exploded view.

It is noted that the drawings are schematic, not necessarily to scale and that details that are not required for understanding the present invention may have been omitted. The terms "upward", "downward", "below", "above", and the like relate to the embodiments as oriented during normal use and as shown in the drawings, unless otherwise specified.

FIG. 1 shows the steering section of a bicycle 1 according to the invention. The bicycle comprises a frame 2 with a head tube 3 and a down tube 4 having one end 5 connecting to the head tube 3. In other models the frame can additionally have a horizontal tube or a parallel second down tube reinforcing the frame structure.

A stem 6 holding a handlebar 7 is mounted to the head tube 3 and is rotatable about a steering axis X. The stem 6 comprises a lower part 8 aligned with the head tube 3, and an upper part 9 supporting the handlebars 7. In the shown exemplary embodiment, the orientation of the upper part 9 relative to the lower part 8 is adjustable by means of an adjustable joint 10, so a user can adjust the height of the handlebars 7.

A fork 11 is mounted to the lower end of the head tube 3 and is rotatable with the stem 6 and the handlebars 7. Pulling one end of the handlebar 7 rotates the stem 6 with the fork 11 and the front wheel (not shown) relative to the head tube 3 so the bicycle 1 makes a turn.

Cables 12, only partly shown in FIG. 1, run from the brake levers (not shown) and gear control levers (also not shown) to a cable entry passage 13.

Figure 3:
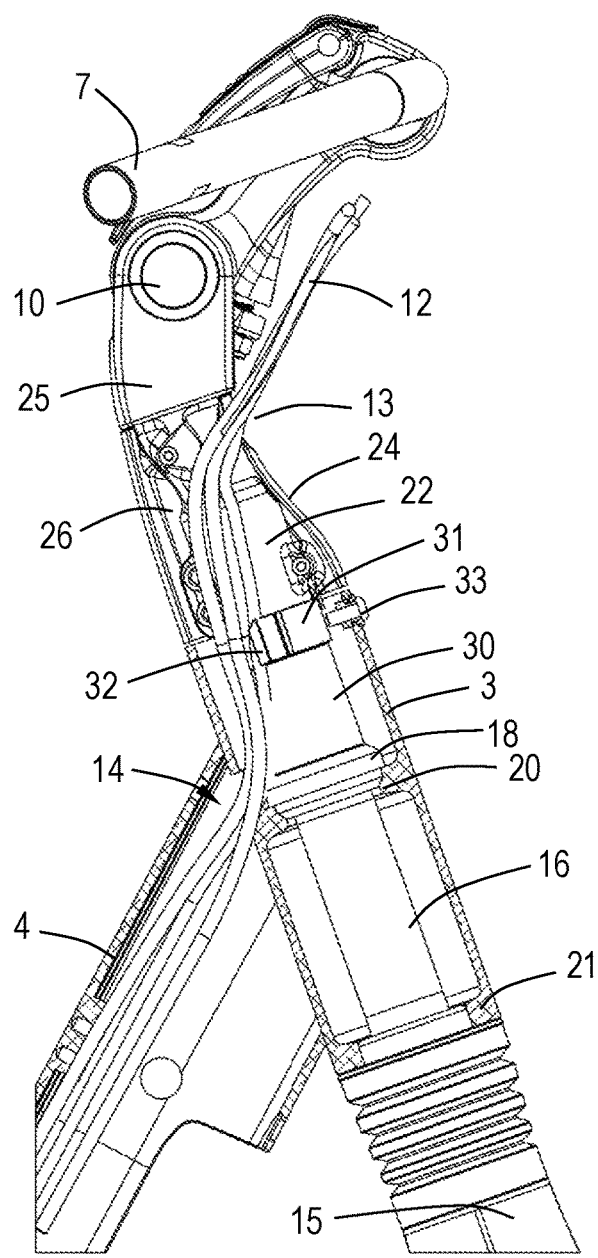
FIG. 3: shows the section of FIG. 1 with the head tube and down tube in cross section.
Figure 4:
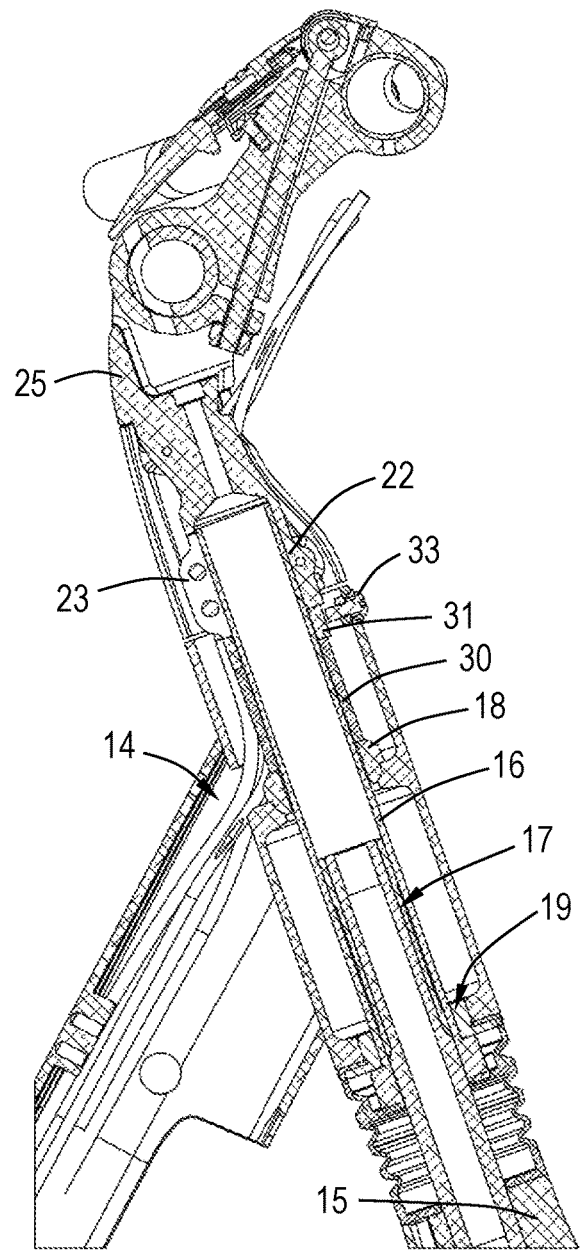
FIG. 4: shows the section of FIG. 1 fully in cross section.

FIG. 3 shows a side view with only the frame parts in cross section, showing the further routing of the cables 12, while FIG. 4 shows a view with all parts in cross section. The head tube 3 is provided with a cable passage 14 where it connects to the outer end 5 of the down tube 4. The cable passage 14 is fully surrounded by the wall of the connecting end 5 of the down tube. Via this cable passage 14, the cables 12 pass from the interior of the head tube 3 into the interior of the down tube 4.

The fork 11 has a tubular fork crown 15 and a steering tube 16 mounted onto the fork crown 15 (FIG. 4). The steering tube 16 of the fork 11 projects through the open top end of the head tube 3. The steering tube 16 interfaces with the interior of the head tube 3 by means of an upper bearing 18 and a lower bearing 19. The upper and lower bearing 18, 19 are plain bearings resting in respective seats formed by inwardly projecting annular rims 20, 21 in the head tube 3. The upper bearing 18 is just below the cable passage 14 connecting the interior of the head tube 3 and the interior of the down tube 4. The stem 6 has a tubular clamping section 22 clamped onto the top end of the steering tube 16 by means of a clamping flange 23 with tensioning screws. Other connection mechanisms can also be used.

The clamping section 22 is covered by a stem cover 24. The stem cover 24 has a top end connecting to a top section 25 of the lower part of the stem 6. This top end of the stem cover 24 defines the cable entry opening 13 formed by a recess of the top edge of the stem cover 24.

The stem cover 24 is visually integral with the frame and flush with the head tube 3 and with the adjacent top section 25 of the lower part of the stem 6. The stem cover 24 confines an annular space 26 around the clamping section 22 of the stem 6 allowing passage of the cables 12.

In the shown exemplary embodiment, the stem cover 24 is composed of two symmetrical semi-tubular sections 27, 28 fitting around the clamping section 22 of the stem 6. The cover sections 27, 28 have openings 29 for receiving screws attaching the cover sections 27, 28 to the clamping section 22 of the stem 6. The cover sections 27, 28 rotate with the stem 6 during steering.

The gear change and brake cables 12 are routed from the handlebars 7 through the cable entry opening 13 in the stem cover 24, the annular space 26 enclosed by of the stem cover 24, the interior of the head tube 3 and the cable passage 14 into the down tube 4.

A cylindrical spacer 30 rests on top of the upper bearing 18 and covers part of the steering tube 16. On top of the spacer 30 is a ring-shaped rotation limiting device 31 with a radially extending lateral projection 32. At the same level, the head tube 3 is provided with an inwardly projecting pin 33. The inwardly projecting pin 33 and the projection 32 of the rotation limiting device 31 form a stop limiting rotational movement by the stem 6 and the fork crown 15. This prevents damage of the cables 12 by extreme rotation of the steer. The rotation limiting device 31 is embodied as a separate part, so it is easily replaceable when damaged. Due to the spacer 30 the rotation limiting device 31 is close to the open top end of the head tube 3 and therefore easily accessible for repair.

Figure 5:
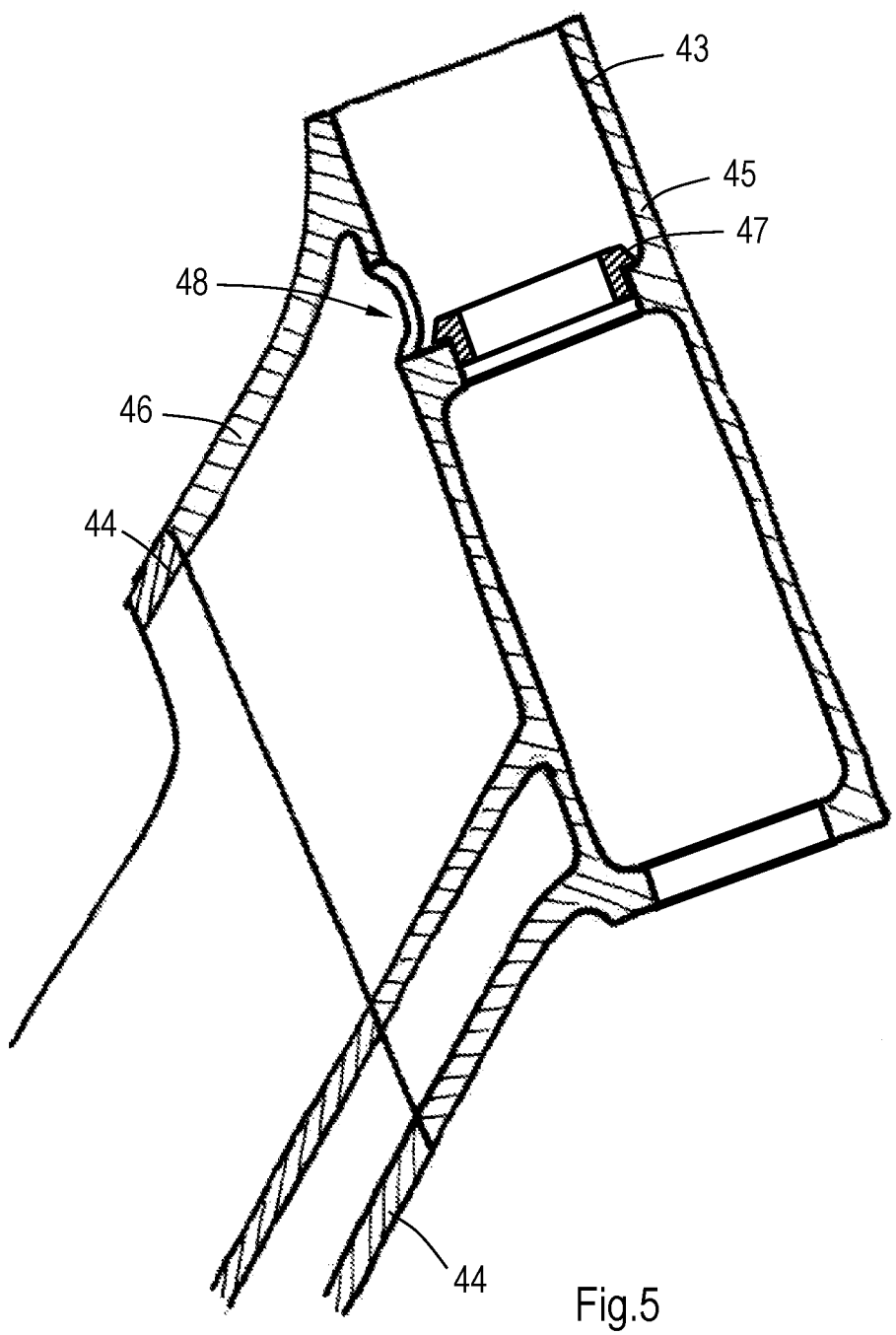
FIG. 5: shows a head tube—down tube configuration of an alternative embodiment.

FIG. 5 shows in cross section an alternative connection of a head tube 43 and a down tube 44. The head tube 43 comprises a tubular main section 45 and a tubular skirt 46 branching off from the main section 45. The main section 45 and the skirt 46 form a single integral part, e.g., a moulded part. The skirt 46 connects to the down tube 44 and is aligned and flush with the down tube 44. An upper bearing 47 is positioned within the head tube 43. A cable passage 48 is positioned between the upper bearing 47 and the end of the head tube 43. The cable passage 48 is surrounded by the skirt 46. In this arrangement, the down tube 44 is not directly connected to the cable passage 48.

The disclosure is not restricted to the above described embodiments which can be varied in a number of ways within the scope of the claims.

The invention claimed is:

1. A bicycle comprising:
 a head tube;
 a down tube connected to the head tube, the head tube comprising a cable passage connecting the interior of the head tube with the interior of the down tube; and
 a steering tube rotatably engaging an upper bearing and a lower bearing within the head tube,
 wherein the upper bearing is below the cable passage.

2. The bicycle according to claim 1, further comprising one or more cables entering the head tube at a top end of the head tube and leaving the head tube via the cable passage to the down tube.

3. The bicycle according to claim 2, further comprising a stem with one end connected to a top end of the steering tube, wherein the assembly of the steering tube and the stem projects through the open end of the head tube leaving space for passage of the one or more cables via the top end of the head tube.

4. The bicycle according to claim 3, further comprising a stem cover covering at least a lower part of the stem and adjacent sections of said one or more cables, the stem cover having a top end joining the stem, the stem cover being provided with a cable entry opening.

5. The bicycle according to claim 4, wherein the stem cover is flush with the head tube and with the adjacent upper part of the stem.

6. The bicycle according to claim 4, wherein the stem cover comprises at least two semi-tubular sections fitting around the lower stem section.

7. The bicycle according to claim 4, wherein the stem cover comprises an attachment part for a bicycle lamp.

8. The bicycle according to claim 4, wherein the stem cover is connected to the stem so as to rotate with the stem during steering.

9. The bicycle according to claim 4, wherein the stem cover confines a channel guiding the cables from the cable entry opening to the cable passage to the down tube.

10. The bicycle according to claim 1, further comprising a rotation limiting device for limiting rotation of the steering tube relative to the head tube.

11. The bicycle according to claim 10, wherein the rotation limiting device is positioned between the cable passage and the top end of the head tube.

12. The bicycle according to claim 11, further comprising a spacer between the upper bearing and the rotation limiting device.

13. The bicycle according to claim 5, wherein the stem cover comprises at least two semi-tubular sections fitting around the lower stem section.

14. The bicycle according to claim 13, wherein the stem cover comprises an attachment part for a bicycle lamp.

15. The bicycle according to claim 14, wherein the stem cover is connected to the stem so as to rotate with the stem during steering.

16. The bicycle according to claim 15, wherein the stem cover confines a channel guiding the cables from the cable entry opening to the cable passage to the down tube.

17. The bicycle according to claim 16, further comprising a rotation limiting device for limiting rotation of the steering tube relative to the head tube.

18. The bicycle according to claim 17, wherein the rotation limiting device is positioned between the cable passage and the top end of the head tube.

19. The bicycle according to claim 18, further comprising a spacer between the upper bearing and the rotation limiting device.

20. The bicycle according to claim 6, wherein the stem cover comprises an attachment part for a bicycle lamp, the stem cover is connected to the stem so as to rotate with the stem during steering and the stem cover confines a channel guiding the cables from the cable entry opening to the cable passage to the down tube, said bicycle further comprising
    a rotation limiting device positioned between the cable passage and the top end of the head tube for limiting rotation of the steering tube relative to the head tube; and
    a spacer between the upper bearing and the rotation limiting device.

\* \* \* \* \*